Aug. 29, 1967 G. A. MOYER ET AL 3,338,821
QUENCHING OF CATALYTIC CRACKING REACTOR VAPORS
IN FEED LINE TO FRACTIONATOR
Filed Nov. 18, 1964
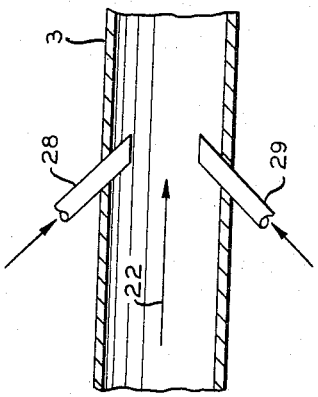
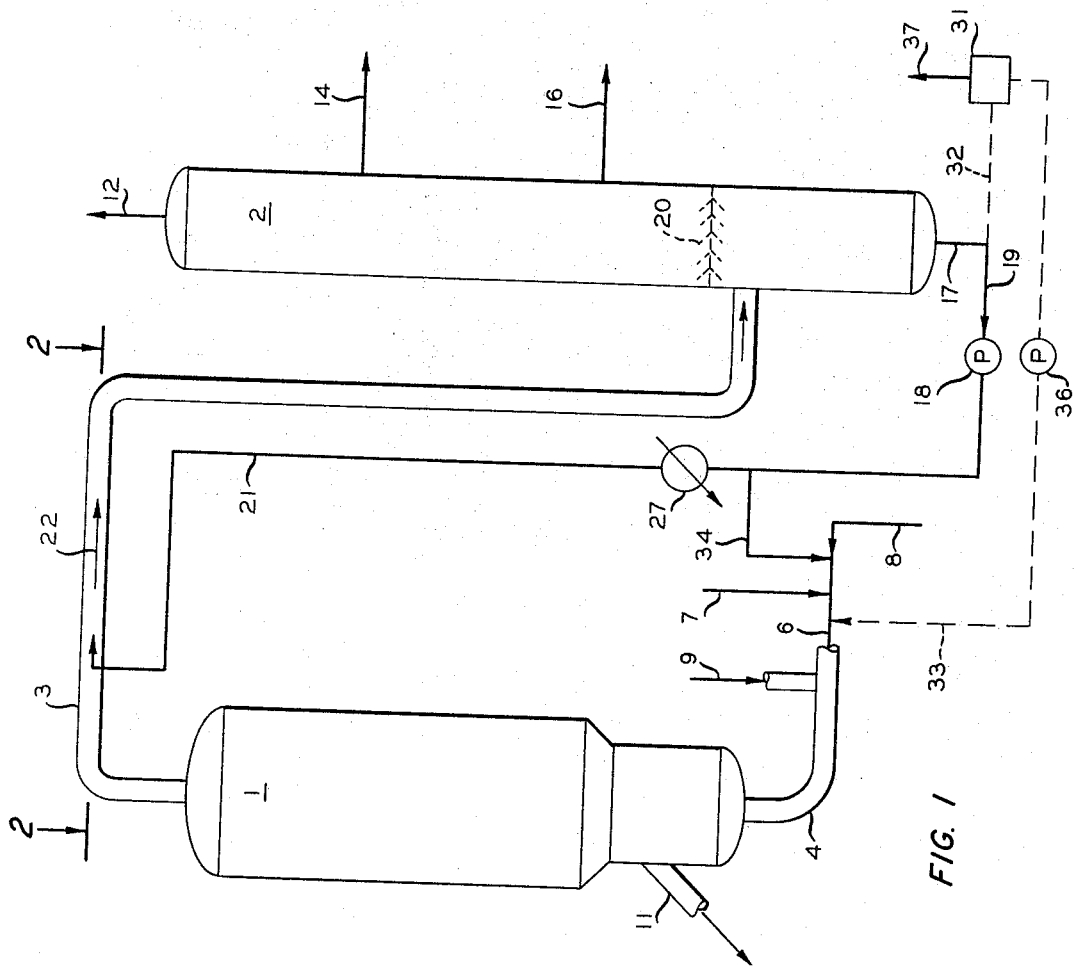
INVENTORS
G. A. MOYER
S. E. FORSYTH
Young and Quigg
ATTORNEYS

United States Patent Office 3,338,821
Patented Aug. 29, 1967

3,338,821
QUENCHING OF CATALYTIC CRACKING REACTOR VAPORS IN FEED LINE TO FRACTIONATOR
Golden A. Moyer and Samuel E. Forsyth, Bartlesville, Okla., assignors to Phillips Petroleum Company, a corporation of Delaware
Filed Nov. 18, 1964, Ser. No. 412,032
6 Claims. (Cl. 208—113)

This invention relates to the catalytic conversion of hydrocarbons and the subsequent separation of said converted hydrocarbons into different fractions. In one aspect, this invention relates to a method of and apparatus for quenching the products passing from a catalytic cracking zone to a fractionation zone. In another aspect, this invention relates to a method of and apparatus for improving the operation of a fractionator.

The methods and apparatus of the prior art for converting complex hydrocarbons into more usable components involves passing the complex hydrocarbons in admixture with a finely divided cracking catalyst and steam into a cracking reactor. The catalyst material having a carbonaceous deposit is continuously withdrawn from a point near the bottom of the reactor and passed to a catalyst regenerator which functions to burn off a portion of the carbonaceous material and to heat the catalyst such that it can be recycled back to the reactor. The converted hydrocarbons are removed from the top of the reactor and passed to a fractionator which will serve to separate the converted hydrocarbons into their respective components including light fractions and heavy residual oil. Conventionally, the temperature of the converted hydrocarbons is reduced as they enter the fractionator so as to allow separation of the various components. Although it is common practice to employ at least one gas-solids separator of the cyclone type or the like in the upper portion of the catalytic reactor so as to prevent catalyst from being carried out of the reactor, it is well known that a certain amount of catalyst fines will always be carried into the fractionator along with the stream of converted hydrocarbons. This is undesirable because the entrained catalyst will pass upward in the fractionator thereby collecting on the bubble trays in the fractionator column. Eventually, the catalyst will plug the openings in the fractionator trays and it will become necessary to stop the cracking operation so that they can be cleaned.

Another disadvantage inherent with the prior art methods for converting hydrocarbons is that the product stream from the reactor remains in the vapor state during its travel to the fractionator. This causes the converted hydrocarbons including the unavoidably entrained catalyst to travel through the conduit connecting the reactor and the fractionator at a tremendously high velocity. The high velocity of the product stream is undesirable because the finely divided particles of catalyst will erode the interior surfaces of the connecting conduit to a degree that frequent repairs are necessary.

According to this invention, these and other disadvantages of the prior art methods for converting hydrocarbons are overcome by passing the highly refractive residual oil including catalyst recovered in the fractionator as a slurry into admixture with the vapor stream of converted hydrocarbons passing to the reactor at a point near the vapor product outlet of the reactor. The slurry is cooled before being admixed with the product stream passing from the reactor by passing it through an indirect heat exchange cooler. The cool slurry will thus serve to quench the vapor product stream and thereby effect a desired direct contact heat exchange of the converted hydrocarbons so as to stop the cracking reaction immediately. This quenching of the product stream containing the unavoidably entrained catalyst will serve to isolate the entrained catalyst from the desired cracked hydrocarbon components such that the catalyst can be removed along with the residual oil from the bottom of the fractionator. This prevents the catalyst particles from being carried upward into the bubble trays of the fractionator. Another advantage obtained by quenching the product stream during its travel to the fractionator is that the components in the product stream which comprise the residual oil are condensed to the liquid state thereby decreasing the vapor volume of the product stream. This results in a smaller quantity of vapor passing to the fractionator. Since the volume of the product stream and its temperature are decreased, its velocity through the conduit leading to the fractionator is likewise decreased. This is a desirable feature of the invention because the entrained catalyst at this lower velocity will not be as detrimental to the interior surfaces of the connecting conduit. Moreover, the product stream will enter the fractionator at a lower velocity thereby decreasing the tendency of the condensed residual oil and catalyst to flow upward through the trays in the fractionator. Since the entrained catalyst in the product stream is removed from the fractionator along with the residual oil as a slurry of catalyst in oil, and since the slurry is used to quench the product stream, the net quantity of catalyst in the product stream between the point of quench and the fractionator is increased by the amount of catalyst contained in the slurry. This results in an advantage over the methods of the prior art because the increased amount of catalyst in the partially liquid product stream will serve to contact and to scrub off coke and the like which have become deposited on the interior surfaces of the conduit leading to the fractionator notwithstanding the relatively low velocity of the product stream. It is apparent that this advantage could not be realized by practicing prior art methods of quenching in the feed line to the fractionator because by circulating only the residual oil into admixture with the product stream from the reactor, no scrubbing effect will result.

Accordingly, it is an object of this invention to provide an improved method of and apparatus for the catalytic conversion of hydrocarbons and the subsequent separation of said converted hydrocarbons into different components.

Another object of this invention is to provide a method of and apparatus for removing entrained catalyst from the feed passing to a fractionator.

Still another object of this invention is to prevent entrained catalyst in the feed to a fractionator from passing upward through the trays in the fractionator.

Another object of this invention is to cool the vapor product from a catalytic cracking reactor so as to condense the components which comprise the residual oil.

A further object of this invention is to prevent residual oil containing finely divided particles of catalyst from passing upward through the trays in a fractionator.

A still further object of this invention is to prevent the interior surfaces of the conduit connecting a catalyst cracker and a fractionator from becoming eroded.

These and other objects will become apparent to one skilled in the art after studying the detailed specification, the appended claims, and the accompanying drawing in which:

FIGURE 1 is a diagrammatic illustration of one embodiment of the invention; and

FIGURE 2 is an enlarged partial cross-section taken along the lines 2—2 of FIGURE 1.

Various pumps, valves, pressure gauges, etc., not necessary in explaining the invention to one skilled in the art, have been omitted for the sake of clarity. It will be obvious to one skilled in the art that many modifications can be made to the system and apparatus shown without departing from the spirit and scope of the invention.

Referring now to the drawing wherein like reference numerals are used to denote like elements, and particularly to FIGURE 1, a fluidized type of catalytic reactor 1 is connected to a fractionator 2 by means of a conduit 3 which extends from the top of the reactor to the lower portion of the fractionator. A feed riser conduit 4 having a manifold section 6 is operatively connected to the reactor in a manner which will allow a feed stock such as gas oil and/or topped crude introduced by means of conduit 7 and steam introduced by means of conduit 8 to be passed through the riser 4 into the bottom of the reactor. Hot regenerated catalyst from a catalyst regeneration zone or the like can be passed to the riser 4 by means of downcomer conduit 9 such that the feed stock and steam will carry the catalyst into the reactor. Spent catalyst which has been steam stripped can be continuously withdrawn from the reactor and circulated through a catalyst regeneration zone by means of downcomer conduit 11. The catalyst is in the form of finely divided particles which assume a fluidized condition within the reactor. Suitable cracking catalysts which can be used in the practice of this invention include acid activated bentonite clays, and synthetic composite gel catalyst systems such as silica-alumina, silica-magnesia, the molecular sieve type, and the like. The catalyst particles range in size from about 100 to 400 mesh. A major portion of the catalyst particles fall within the range of between about 20 and 80 microns in diameter. This size catalyst particle is easily fluidized within the reactor, and is easily conveyed through the regeneration equipment.

The reactor 1 can be of any suitable type well known in the art. It is generally preferred to equip the reactor with an interiorially disposed cyclone separator (not shown) which will serve to remove substantially all of the entrained catalyst from the hydrocarbon vapors before they enter conduit 3.

The fractionator 2 is provided with a plurality of interiorially disposed conventional fractionating trays such as bubble cap, sieve, plate, etc., units. These will serve to separate the converted hydrocarbons into different fractions as the hydrocarbon vapors ascend and condense within the fractionator. The light hydrocarbons and gasoline components, including steam, can be removed from the fractionator 2 by means of conduit 12 which is connected to the top of the fractionator. Light and heavy cycle oils can be removed by means of conduits 14 and 16, respectively. The bottoms in the fractionator include a highly refractory residual oil containing particles of catalyst which were unavoidably entrained in the products from the reactor 2. The catalyst particles are present in the residual oil because of the quenching of the product stream, as will be more fully hereinafter described.

The fractionator 2 is provided with a baffle 20 positioned above the point at which the reactor products enter the fractionator. The baffle 20 can be constructed from a plurality of right-angle members secured to a horizontally positioned support. This will serve to prevent any entrained liquids such as the residual oil including catalyst from being passed upward in the fractionator along with the hydrocarbon vapors, thus allowing the lowermost fractionator tray to function more efficiently. The baffle will also serve to absorb the momentum of the hydrocarbon liquids as they enter the fractionator column thus preventing the liquids from causing damage to the lowermost fractionating trays.

The slurry of residual oil and catalyst can be removed from the bottom of the fractionator by means of a conduit 17 and passed to a pump 18 by means of conduit 19. The pump 18 will serve to transmit the slurry through conduit 21 into admixture with the hot vapor products passing through conduit 3 as indicated by the arrow 22.

The slurry is cooled sufficiently to provide the necessary quenching when it is introduced into admixture with the reactor products passing through conduit 3. This can be accomplished by providing a cooler 27 in indirect heat exchange with the slurry as it passes through conduit 21. Coolant as is necessary to remove heat from the slurry can be circulated through cooler 27 in accordance with practices well known in the art.

Referring now to FIGURE 2 of the drawing, which illustrates the point of juncture between conduit 21 and conduit 3 more clearly, arrow 22 indicates the direction of flow of the products from the reactor 1. Conduit 21 is divided at its upper end by means of a suitable Y coupling or the like (not shown) such that each arm of the Y is operatively connected to conduits 28 and 29. Conduits 28 and 29 are preferably arranged at an angle of 45° with respect to the direction of flow of the products in conduit 3. This angle of the conduits 28 and 29 will insure that the slurry becomes intimately admixed with the reactor products passing through conduit 3, and yet will not cause a back pressure to be created upstream which could otherwise occur if the slurry were introduced at an angle of more than 45° with respect to the direction of flow in conduit 3. This angle will also insure that the inner walls of conduit 3 are contacted with the slurry.

A portion of the residual oil equal to the net make of residual oil can be removed as slurry from conduit 21 and passed into the feed in manifold 6 by means of conduit 34. The residual oil introduced in the manifold 6 in this manner will be carried into the reactor 1 along with the feed wherein it is cracked to extinction. It will usually be necessary to remove a portion of the residual oil from the quench stream in conduit 21 because residual oil produced from the feed to the reactor is recovered as fractionator bottoms and if the total bottoms were continuously recycled into admixture with the reactor products, the fractionator would eventually become flooded with residual oil. The actual amount of residual oil which is removed will equal the amount of residual oil contained in the products from the reactor. By removing this amount, the residual oil in the fractionator will remain substantially constant.

Alternatively, a portion of the slurry can be removed from conduit 17 and passed to a settler 31 by means of conduit 32. The settler 31 will function to establish a heavy residual oil phase containing the catalyst material and a light residual oil phase substantially free of catalyst material. The heavy residual oil phase including the catalyst material can be transferred from the settler 31 into admixture with the feed in manifold 6 by means of conduit 33 and pump 36. The light residual oil phase, referred to as decant oil, can be removed from settler 31 by means of conduit 37. The settler 31 can be of any type well known in the art such as a Dorr thickener or the like. Again, the actual amount of residual oil in the slurry removed by means of conduit 32 will be equal to the net make of residual oil contained in the products from the reactor. Alternatively, a portion of the net make of residual oil can be passed to settler 31 while the remainder of the net make of residual oil can be passed to the reactor.

In the practice of this invention, a feed such as gas oil is passed into manifold 6 by means of conduit 7. Steam from a suitable source is introduced into the manifold 6 by means of conduit 8 and passes with the gas oil and catalyst, from downcomer 9, into the reactor 1. Steam stripped spent catalyst is continuously withdrawn from the reactor by means of downcomer 11, regenerated, and passed into downcomer 9. The overhead vapor product including some unavoidably entrained catalyst is quenched in conduit 3 at a point close to the top of the reactor by relatively cold, residual oil containing entrained catalyst which has been removed as a slurry from the bottom of the fractionator 2. This will serve to condense the net make of residual oil as the reactor product travels through conduit 3, thereby isolating or knocking out the entrained catalyst carried over from the reactor so that the catalyst can be removed from the bottom of the fractionator along with the residual oil as a slurry of oil and catalyst. This way of removing the catalyst prevents the trays in the fractionator 2 from becoming plugged which would otherwise occur if the reactor product were quenched near or in the bottom of the fractionator. By using residual oil containing entrained catalyst as the quenching agent, the scrubbing effect of the catalyst on the interior surface of the conduit between the point of juncture of conduits 3 and 21 and the fractionator 2 is enhanced due to the increased amount of catalyst passing through conduit 3. This quenching decreases the vapor load and the velocity of the product flowing to the fractionator. Data showed that the velocity of the vapor product in conduit 3 decreased from 205 feet per second to 140 feet per second in response to quenching in accordance with this invention.

Although the introduction of slurry into the feed line to the fractionator increases the liquid load in the fractionator, the baffle means 20 will serve to prevent encroachment of this liquid upward into the fractionator.

The following example will serve to illustrate operating conditions of the system. It is to be understood that this example is for the sole purpose of illustrating the invention and must not be considered to be limiting thereof.

SPECIFIC EXAMPLE

| Drawing Number | Condition and/or Material | |
|---|---|---|
| 8 | Steam (400 p.s.i.g.), lbs./hr | 16,000 |
| 7 | Gas Oil Charge, Bbls./day | [1] 60,947 |
|   | Pressure, p.s.i.g | 24 |
|   | Temperature, °F | 825 |
| 3 | Reactor Effluent Before Quenching, M s.c.f./day | 82,983 |
|   | Pressure, p.s.i.g | 16.8 |
|   | Temperature, °F | 950 |
|   | Av. Mol. Wt | 87.3 |
| 21 | Reactor Effluent Quench, Bbls./day (slurry) | 98,328 |
|   | Temperature, °F | 500 |
|   | API Gravity at 60° F | 8 |
| 3 | Fractionator Charge After Quench: | |
|   | Slurry Oil, Bbls./day | 98,328 |
|   | Products from Reactor, M s.c.f./day | 82,983 |
|   | Pressure, p.s.i.g | 15 |
|   | Temperature, °F | 700 |
| 12 | Overhead From Fractionator, M s.c.f./day [2] | 71,276 |
|   | Pressure, p.s.i.g | 8.8 |
|   | Temperature, °F | 250 |
|   | Av. Mol. Wt | 47.6 |
| 14 | Light Cycle Oil, Bbls./day | 5,100 |
|   | API Gravity at 60° F | 30 |
| 16 | Heavy Cycle Oil, Bbls./day | 26,947 |
|   | API Gravity at 60° F | 23 |
| 17 | Bottoms Yield, Bbls./day (slurry) | 98,928 |
|   | API Gravity at 60° F | 8 |
| 34 | Slurry, Bbls./day (net) | [3] 600 |
|   | API Gravity at 60° F | 8 |

[1] Includes 34,000 Bbls./day virgin gas oil (29.3° API) and 26,947 Bbls./day heavy cycle oil recycle (23.0° API).
[2] M s.c.f. means thousand standard cubic feet of vapor.
[3] Slurry oil of 600 Bbls./day net (8° API) is charged to reactor 1.

Since it is desirable for the feed to the fractionator to be at a temperature of about 700° F., the temperature of the slurry used as quench can be varied in response to the volume and temperature of the slurry and the volume and temperature of the vapor effluent from the reactor. Thus, when the overhead products from the reactor are in the temperature range of from 875 to 975° F., the temperature of the slurry used to quench the overhead products can be in the range of from 550 to 450° F. The ratio of reactor vapor effluent in M s.c.f./day to the slurry quench in barrels per day can be in the range of from about 1.2:1 to about 0.8:1. In a specific example, in order to obtain a fractionator feed zone temperature of 680° F. when the reactor products were at a temperature of 950° F., the temperature of the quench slurry oil was lowered to 500° F., and the ratio of reactor vapor (M s.c.f./d.) to slurry (bbl./d.) was about 0.85 to 1.

The following table illustrates typical operating conditions for the reactor and the fractionator.

TABLE I

| Reactor: | |
|---|---|
| Temperature, °F | 950 |
| Average pressure, p.s.i.g | 17.5 |
| Catalyst to oil wt. ratio | 5.3:1 |
| Conversion, percent | 85 |
| Temperature of catalyst introduced, °F | 1125 |
| Fractionator: | |
| Top temperature, °F | 250 |
| Bottom temperature, °F | 680 |
| Top pressure, p.s.i.g | 8.8 |
| Bottom pressure, p.s.i.g | 13.2 |
| Velocity of vapor in conduit 3, feet/second: | |
| With quench | 140 |
| Without quench | 205 |

Although the invention has been described in considerable detail for the purpose of illustration, it is to be understood that such detail is for that purpose only and that many variations and modifications can be made by one skilled in the art without departing from the spirit and scope of the invention.

We claim:

1. In a process for the catalytic conversion of a hydrocarbon material wherein the products from a catalytic cracking zone are passed to a fractionating zone to produce light hydrocarbon fractions and a slurry including residual oil and catalyst material which has been carried with the products from said cracking zone, the improvement comprising withdrawing said slurry from said fractionating zone; cooling said withdrawn slurry; and passing said cooled slurry into admixture with said products passing from said cracking zone to said fractionating zone to quench said products, said cooled slurry being passed into admixture with said products before said products arrive at said fractionating zone.

2. A process according to claim 1 wherein said cooled slurry is admixed with said products passing from said cracking zone to said fractionating zone at a point adjacent said cracking zone.

3. In a process for the catalytic conversion of a hydrocarbon material wherein the products from a catalytic cracking zone are passed to a fractionating zone to produce light hydrocarbon fractions and residual oil, said residual oil containing catalyst material which has been carried with the products from said cracking zone, the improvement comprising withdrawing said residual oil containing catalyst material from said fractionation zone; passing a portion of said withdrawn residual oil containing catalyst material into said cracking zone, said portion being substantially equal to the amount of residual oil contained in the products from said cracking zone; cooling the remaining portion of said withdrawn residual oil containing catalyst material; and passing said cooled residual oil containing catalyst material into admixture with said products passing to said fractionation zone, said cooled residual oil containing catalyst material being passed into admixture with said products before said products arrive at said fractionating zone.

4. A process according to claim 3 wherein said cooled residual oil containing catalyst material is admixed with said products passing from said cracking zone to said fractionating zone at a point adjacent said cracking zone.

5. In a process for the catalytic conversion of a hydrocarbon material wherein the products from a catalytic cracking zone are passed to a fractionation zone to produce light hydrocarbon fractions and residual oil, said residual coil containing catalyst material which has been carried with the products from said cracking zone, the improvement comprising withdrawing said residual oil containing catalyst material from said fractionation zone; passing a portion of said withdrawn residual oil containing catalyst material to a settling zone to produce a heavy residual oil phase containing catalyst material and a lighter residual oil phase substantially free of catalyst material, said portion being substantially equal to the amount of residual oil contained in the products from said cracking zone; passing said heavy residual oil phase containing catalyst material from said settling zone to said cracking zone; cooling the remaining portion of said withdrawn residual oil containing catalyst material; and passing said cooled residual oil containing catalyst material into admixture with said products passing to said fractionation zone, said cooled residual oil containing catalyst material being passed into admixture with said products before said products arrive at said fractionating zone.

6. A process according to claim 5 wherein said cooled residual oil containing catalyst material is admixed with said products passing from said cracking zone to said fractionating zone at a point adjacent said cracking zone.

References Cited

UNITED STATES PATENTS

| | | | |
|---|---|---|---|
| 2,890,999 | 6/1959 | Polack | 208—127 |
| 3,065,165 | 11/1962 | Amis et al. | 208—101 |
| 3,131,032 | 4/1964 | McKenna | 208—47 |
| 3,174,924 | 3/1965 | Clark et al. | 208—48 |

DELBERT E. GANTZ, *Primary Examiner.*

ABRAHAM RIMENS, *Examiner.*